(12) United States Patent
Hoshino et al.

(10) Patent No.: US 6,651,457 B2
(45) Date of Patent: Nov. 25, 2003

(54) ABSORPTION REFRIGERATOR

(75) Inventors: Toshiyuki Hoshino, Tochigi-ken (JP); Masahiro Furukawa, Tochigi-ken (JP)

(73) Assignees: Sanyo Electric Co., Ltd., Osaka-fu (JP); Sanyo Electric Air Conditioning Co., Ltd., Tochigi-ken (JP)

( * ) Notice: Subject to any disclaimer, the term of this patent is extended or adjusted under 35 U.S.C. 154(b) by 0 days.

(21) Appl. No.: 10/209,562

(22) Filed: Jul. 30, 2002

(65) Prior Publication Data

US 2003/0024260 A1 Feb. 6, 2003

(30) Foreign Application Priority Data

Jul. 31, 2001 (JP) ........................................ 2001-231887

(51) Int. Cl.[7] .......................... F25B 15/00; F25B 13/00
(52) U.S. Cl. ........................... 62/476; 62/489; 62/324.2
(58) Field of Search ............................... 62/324.2, 476, 62/489, 141, 483, 485, 481, 497

(56) References Cited

U.S. PATENT DOCUMENTS 5,255,528 A  * 10/1993 Dao ............................. 62/476

* cited by examiner

Primary Examiner—Chen Wen Jiang
(74) Attorney, Agent, or Firm—Weingarten, Schurgin, Gagnebin & Lebovici LLP

(57) ABSTRACT

The object of the invention is to improve heat efficiency of an absorption refrigerator driven by exhaust heat supplied from the other apparatus as a part of heat sources.

A diluted absorption liquid that absorbs a refrigerant in an absorber to decrease in concentration of the absorption liquid is discharged to the absorption liquid pipe and then branched to be supplied to first and second spaces of an exhaust heat regenerator. The diluted absorption liquid is heated by exhaust gas supplied through the exhaust heat supply pipe in each space and concentrated and regenerated for the first time. The absorption liquid concentrated and regenerated in the first space is supplied to a high-temperature regenerator and further heated by a gas burner. The heated absorption liquid is flown into a vapor-liquid separator in a mixed state of vapor and liquid, and then separated into refrigerant vapor and further concentrated absorption liquid.

1 Claim, 3 Drawing Sheets

(A)

(B)

ABSORPTION REFRIGERATOR

BACKGROUND OF THE INVENTION

1. Field of the Invention

The present invention relates to an absorption refrigerator (including an absorption water chilling/heating machine) heating and regenerating an absorption liquid by using a combination of heat of combustion generated by a gas burner or the like and exhaust heat supplied from the other apparatus.

2. Detailed Description of the Prior Art

As an absorption refrigerator of this type, one utilizing exhaust gas of high temperature supplied from a cogeneration apparatus or the like as a part of driving heat sources has been known.

In the above-described absorption refrigerator, in order to reduce fuel costs consumed by the gas burner or the like and reduce $CO_2$ emissions, which greatly affect global warming, heat contained in the exhaust gas supplied from a cogeneration apparatus or the like needs to be utilized as efficiently as possible, which has been a problem to be solved.

SUMMARY OF THE INVENTION

The present invention provides an absorption refrigerator as concrete means for solving the problems of the foregoing prior art.

The absorption refrigerator, comprising:

high temperature and low temperature regenerators as regenerators for regenerating an absorption liquid to absorb a refrigerant by evaporating and separating a refrigerant contained in the absorption liquid by heating the absorption liquid;

an exhaust heat regenerator driven by using exhaust heat as a heat source; and high temperature and low temperature heat exchangers as heat exchangers for exchanging heat between absorption liquids of different temperatures; wherein in the exhaust heat regenerator, a first absorption liquid supplied from an absorber via the high temperature and low temperature regenerators and a second absorption liquid supplied from the absorber via the low temperature regenerator are heated by the exhaust heat for regeneration; and wherein in a cooling operation, the absorption liquid regenerated from the first absorption liquid by heating in the exhaust heat regenerator is supplied to the high temperature regenerator, a mixture fluid of liquid and vapor generated by heating in the high temperature regenerator is supplied to a vapor-liquid separator to be separated into refrigerant vapor and an absorption liquid, the refrigerant vapor separated in the vapor-liquid separator is supplied to the low temperature regenerator as a heat source together with refrigerant vapor evaporated and separated from the first absorption liquid in the exhaust heat regenerator, refrigerant vapor evaporated and separated from the second absorption liquid is supplied to one of the low temperature regenerator and a condenser, the absorption liquid separated in the vapor-liquid separator is supplied to the low temperature regenerator via the high temperature heat exchanger, and an absorption liquid regenerated by heating in the low temperature regenerator joins an absorption liquid regenerated from the second absorption liquid by heating in the exhaust heat regenerator to be returned to the absorber via the low temperature heat exchanger, and wherein in a heating operation, the absorption liquid regenerated from the first absorption liquid by heating in the exhaust heat regenerator is supplied to the high temperature regenerator, a mixture fluid of liquid and vapor generated by heating in the high temperature regenerator is supplied to the vapor-liquid separator to be separated into refrigerant vapor and an absorption liquid, the refrigerant vapor and the absorption liquid separated from each other in the vapor-liquid separator are supplied to one of the evaporator and the absorber together with refrigerant vapor evaporate and separated from the first and second absorption liquids in the exhaust heat regenerator, and an absorption liquid regenerated from the second absorption liquid by heating in the exhaust heat regenerator is returned to the absorber via the low temperature heat exchanger.

BRIEF DESCRIPTION OF THE DRAWINGS

FIG. 3A showing heat efficiency in the present invention, and FIG. 3B showing heat efficiency in the prior art.

DETAILED DESCRIPTION OF THE PREFERRED EMBODIMENTS

First Embodiment

Figure 1:
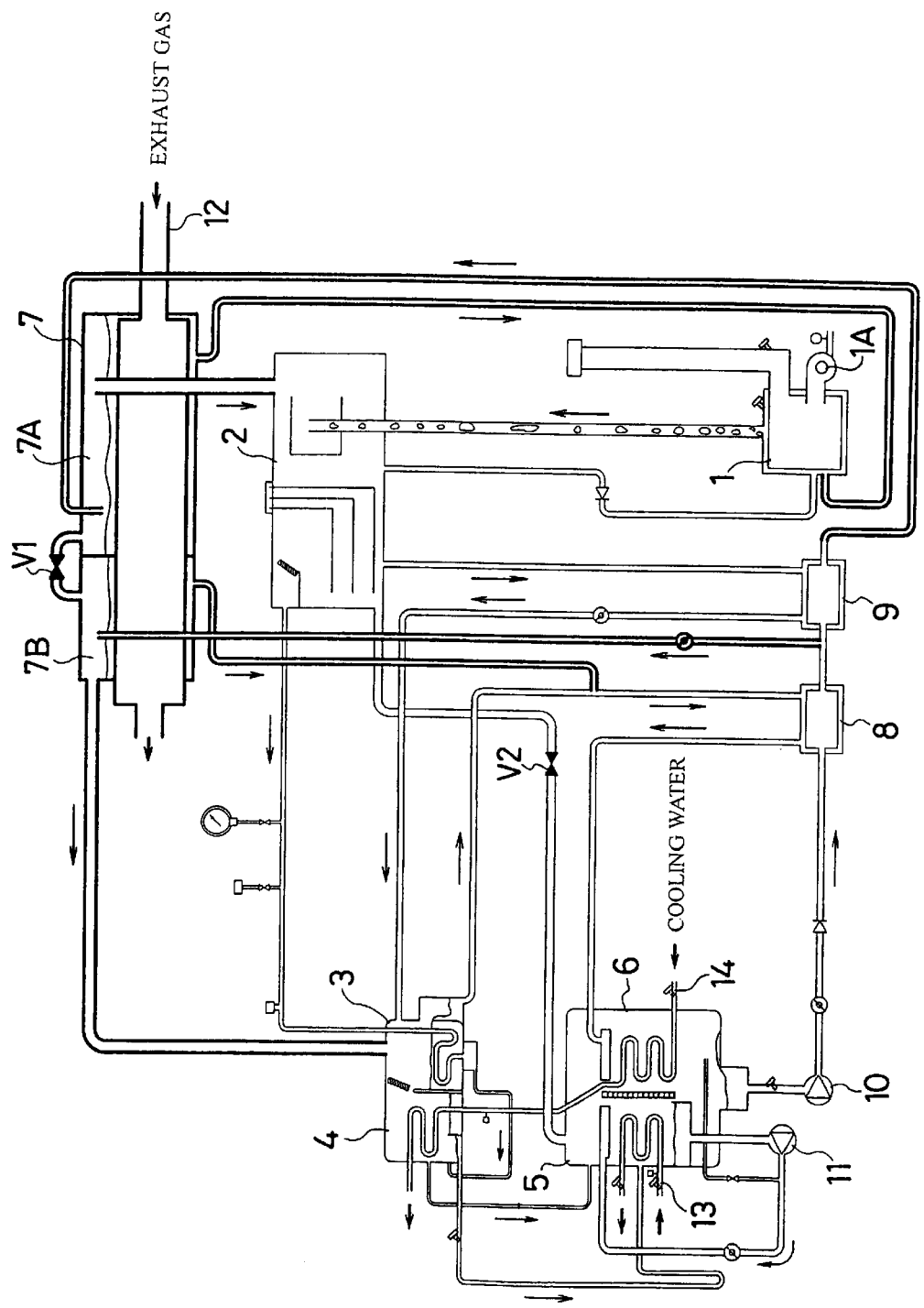
FIG. 1 is an explanatory view showing a state during a cooling operation of an absorption refrigerator according to the present invention.

Next, description will be made in detail for an embodiment of the present invention with reference to the drawings.

In the drawings, the reference numeral 1 denotes a high-temperature regenerator, 2 a vapor-liquid separator, 3 a low-temperature regenerator, 4 a condenser, 5 an evaporator, 6 an absorber, 7 an exhaust heat regenerator, 8 a low-temperature heat exchanger, 9 a high-temperature heat exchanger, 10 an absorption liquid pump, and 11 refrigerant pump. These components are interconnected by piping as shown in the drawings, so that a refrigerant and an absorption liquid can be circulated. The reference numeral 12 denotes an exhaust heat supply pipe, 13 a cold/hot water pipe, and 14 a cooling water pipe.

A space in the exhaust heat regenerator 7 into which the absorption liquid is flown is sectioned into a first space 7A into which a first absorption liquid is flown and a second space 7B into which a second absorption liquid is flown. The first absorption liquid is supplied from the absorber 6 via the low-temperature heat exchanger 8 and the high-temperature heat exchanger 9 by an operation of the absorption liquid pump 10. The second absorption liquid is supplied from the absorber 6 via only the low-temperature heat exchanger 8. Both absorption liquids flowing into the first and second spaces 7A and 7B can be heated and regenerated by the exhaust gas of high temperature supplied from a cogeneration apparatus (not-shown) or the like through the exhaust heat supply pipe 12.

Specifically, the exhaust gas of high temperature exhausted from the cogeneration apparatus or the like through the exhaust heat supply pipe 12, for example, exhaust gas of about 250° C. exhausted from an engine for generation of electricity, a gas turbine, or the like is supplied to the exhaust heat regenerator 7. The absorption liquids flowing into the first and second spaces 7A and 7B are heated by the exhaust gas, and a part of refrigerant absorbed by each absorption liquid is evaporated and separated therefrom, so that each absorption liquid is condensed and regenerated.

Upper portions of the first and second spaces 7A and 7B are configured to be communicated with each other through a cooling/heating switch valve V1, which is opened at a heating operation such as heating and closed at a cooling operation such as air-conditioning.

Meanwhile, the high-temperature regenerator 1 is provided with a gas burner 1A capable of burning natural gas or the like, so that the absorption liquid can be heated and regenerated by additional heating. The bottom portion of the vapor-liquid separator 2 and the upper portion of the evaporator 5 in a lower barrel can be communicated through a pipe of a large diameter provided with a cooling/heating switch valve V2, which is opened at the heating operation such as heating and is closed at the cooling operation such as air-conditioning.

In the absorption refrigerator having the above-described constitution, while the cooling/heating switch valves V1 and V2 are closed as shown in FIG. 1, the exhaust gas of high temperature is supplied to the exhaust heat regenerator 7 through the exhaust heat supply pipe 12. Moreover, natural gas or the like is burned by the gas burner 1A, and the cooling water is flown in the cooling water pipe 14. The diluted absorption liquid which absorbs the refrigerant in the absorber 6 to decrease in concentration of the absorption liquid and is discharged to the absorption liquid pipe is branched to be supplied to the first and second spaces 7A and 7B of the exhaust heat regenerator 7 by an operation of the absorption liquid pump 10, and then heated by the heat contained in the exhaust gas supplied through the exhaust heat supply pipe 12 in the respective spaces. Accordingly, a part of the refrigerant absorbed in each absorption liquid is evaporated and separated from the absorption liquid, and thus the first concentration and regeneration of the absorption liquid is performed.

The absorption liquid concentrated and regenerated in the first space 7A, in other words, the absorption liquid which is flown from the absorber 6 via the low-temperature heat exchanger 8 and the high-temperature heat exchanger 9 into the first space 7A of the exhaust heat regenerator 7 and heated by the exhaust gas for concentration and regeneration is supplied to the high-temperature regenerator 1 and further heated by the gas burner 1A.

The absorption liquid heated by the gas burner 1A in the high-temperature regenerator 1 is flown into the vapor-liquid separator 2 in a mixed state of vapor and liquid, and then separated into the refrigerant vapor and the further concentrated absorption liquid.

The absorption liquid which has the refrigerant vapor separated therefrom to be concentrated for the second time heats the diluted absorption liquid supplied from the absorber 6 to the exhaust heat regenerator 7 by heat exchange therewith in the high-temperature exchanger 9, and thereby decreases in temperature. The absorption liquid is then flown into the low-temperature regenerator 3.

Meanwhile, the refrigerant vapor separated from the absorption liquid in the vapor-liquid separator 2 is flown into the low-temperature regenerator 3 together with the refrigerant vapor evaporated and separated from the absorption liquid in the first space 7A of the exhaust heat regenerator 7. Then, the refrigerant vapor further heats the absorption liquid which is passed through the high-temperature exchanger 9 from the vapor-liquid separator 2 to decrease in temperature and then flown into the low-temperature regenerator 3, so that the third concentration is performed.

The refrigerant vapor evaporated from the absorption liquid in the low-temperature regenerator 3 is flown into the condenser 4 adjacent thereto together with the refrigerant vapor evaporated and separated from the absorption liquid in the second space 7B of the exhaust heat regenerator 7, and then releases heat to the cooling water flowing in the cooling water pipe 14 for condensation. The condensed refrigerant is flown into the evaporator 5 in the lower barrel.

The refrigerant liquid flown into the evaporator 5 is sprinkled on the cold/hot water pipe 13 by the refrigerant pump 11 and takes away heat of evaporation from the cold water flowing in the cold/hot water pipe 13 to decrease the temperature of the cold water flowing in the cold/hot water pipe 13. The evaporated refrigerant vapor is flown into the absorber 6 adjacent to the evaporator 5.

The absorption liquid concentrated for the third time in the low-temperature regenerator 3 joins the absorption liquid concentrated for the first time in the second space 7B of the exhaust heat regenerator 7, and is decreased in temperature by heat exchange in the low-temperature heat exchanger 8 with the diluted absorption liquid supplied from the absorber 6 to the exhaust heat regenerator 7. The resultant absorption liquid is then sprinkled from above in the absorber 6. The refrigerant vapor flown into the absorber 6 is absorbed by the sprinkled absorption liquid.

The absorber 6 has the cooling water pipe 14 laid therein, which decreases the temperature of the absorption liquid sprinkled in the absorber 6 and enables the absorption liquid to easily absorb the refrigerant. Such refrigerant absorbing operation by the absorption liquid decreases the pressure in the lower barrel, so that the above-described evaporation of the refrigerant in the evaporator 5 is continued.

The cold water in the cold/hot water pipe 13, having heat of evaporation taken away by the refrigerant in the evaporator 5, is circulatively supplied to a not-shown load, and thus the cooling operation such as air conditioning is performed.

Figure 2:
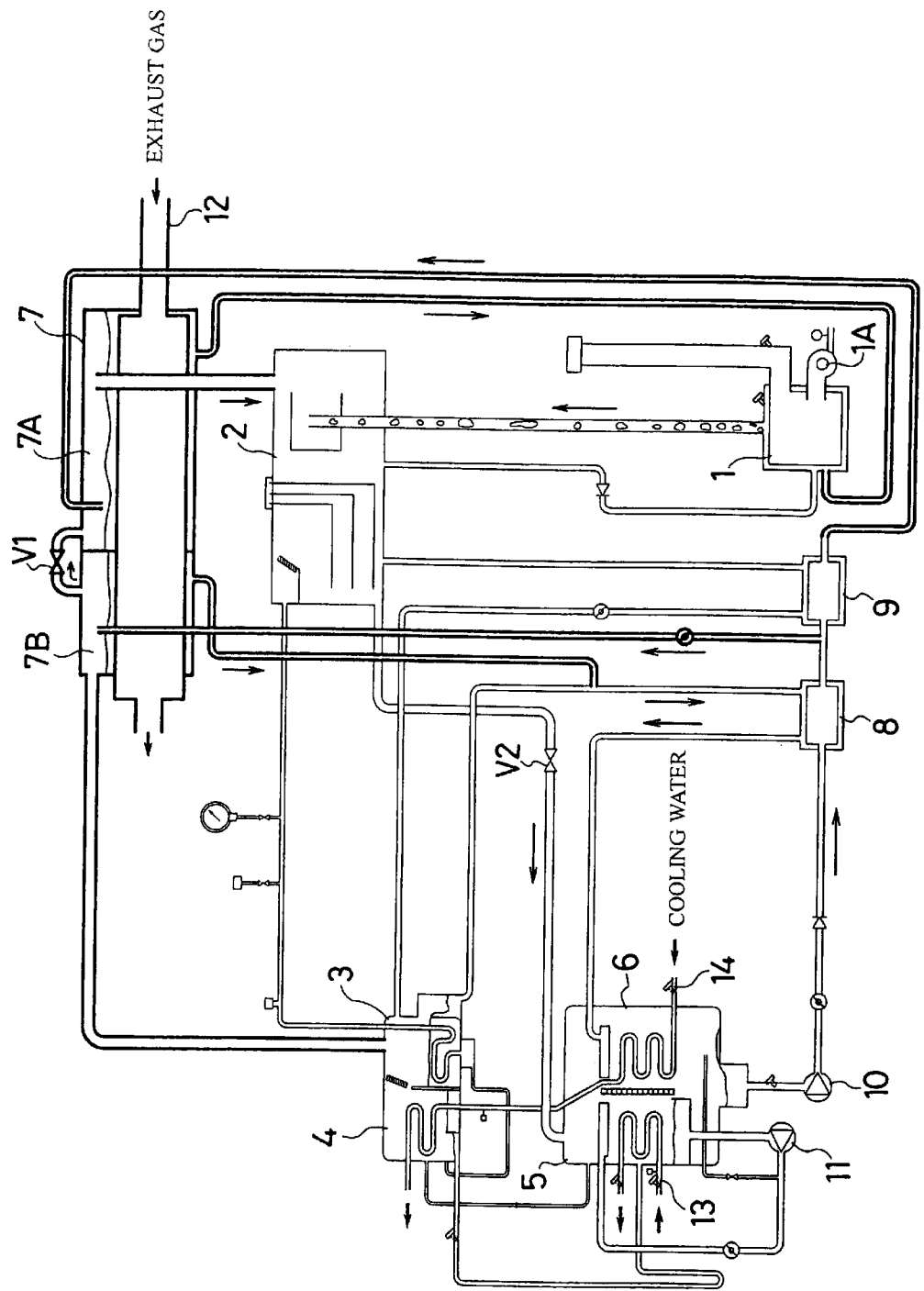
FIG. 2 is an explanatory view showing a state during a heating operation of the absorption refrigerator according to the present invention.

Meanwhile, heating in the high-temperature regenerator 1 and the exhaust heat regenerator 7 is performed while the cooling/heating switch valves V1 and V2 are opened as shown in FIG. 2 and the cooling water is not introduced in the cooling water pipe 14. The diluted absorption liquid which is discharged from the absorber 6 and conveyed by the absorption liquid pipe 10 is, similar to the above-described cooling operation, branched to be supplied to the first and second spaces 7A and 7B of the exhaust heat regenerator 7.

The first absorption liquid flown from the absorber 6 via the low-temperature heat exchanger 8 and the high-temperature heat exchanger 9 into the first space 7A of the exhaust heat regenerator 7 and the second absorption liquid flown from the absorber 6 via only the low-temperature heat exchanger 8 into the second space 7B are heated by heat contained in the exhaust gas supplied through the exhaust heat supply pipe 12 in the respective spaces. A part of the refrigerant absorbed in each absorption liquid is evaporated and separated from the absorption liquid, and thus first concentration and regeneration of the absorption liquid is performed.

The absorption liquid heated for concentration and regeneration in the first space 7A of the exhaust heat regenerator 7 is supplied to the high-temperature regenerator 1 and heated by the gas burner 1A.

The absorption liquid heated by the gas burner 1A in the high-temperature regenerator 1 is flown into the vapor-liquid separator 2 in a mixed state of vapor and liquid, and then separated into the refrigerant vapor and the further concentrated absorption liquid.

The refrigerant vapor and the absorption liquid separated from each other in the vapor-liquid separator 2 and the refrigerant vapor evaporated and separated from the absorption liquids in the first and second spaces 7A and 7B of the exhaust heat regenerator 7 are directly flown into the evaporator 5 in the lower barrel through the thick pipe provided with the opened cooling/heating switch valve V2.

The mixture fluid of the refrigerant vapor and the absorption liquid flown into the evaporator 5 heats the water flowing in the cold/hot water pipe 13 by heat exchange therewith and overflows a refrigerant liquid reservoir into the absorber 6 to be mixed with the absorption liquid, which has the refrigerant evaporated and separated in the second space 7B of the exhaust heat regenerator 7 and flows into the absorber 6 after decreasing in temperature by heat exchange in the low-temperature heat exchanger 8 with the diluted absorption liquid conveyed from the absorber 6 to the exhaust heat regenerator 7.

The hot water in the cold/hot water pipe 13 heated by heat of condensation of the refrigerant vapor in the evaporator 5 and the absorption liquid of high temperature is circulatively supplied to a not-shown load, and thus the heating operation such as heating is performed.

Figure 3:
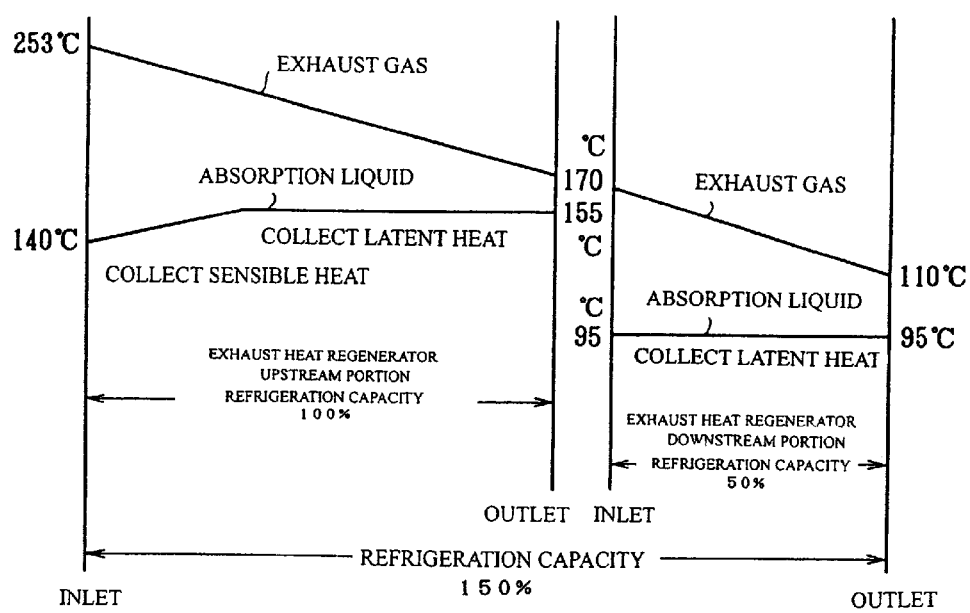
FIGS. 3A and 3B are explanatory views showing heat efficiency of an exhaust heat regenerator.
Figure 3:
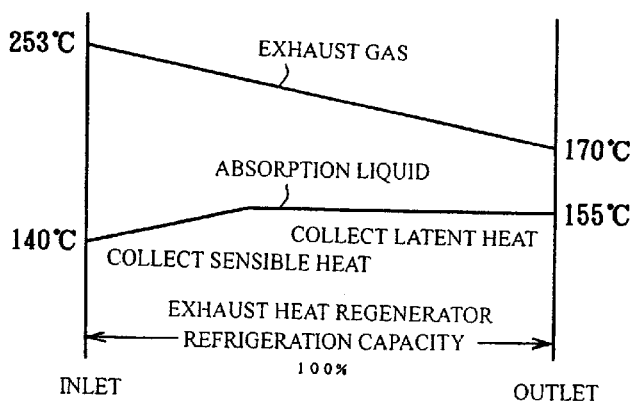

In the absorption refrigerator having the above-described constitution, since the exhaust gas of high temperature supplied from a cogeneration apparatus or the like is utilized as the driving heat source of the exhaust heat regenerator 7 excellent in heat efficiency, total heat efficiency is significantly improved as shown in FIG. 3A, compared with that of the conventional absorption refrigerator as shown in FIG. 3B.

Note that the present invention is not limited to the above-described embodiment, and the various changes may be made therein without departing from the spirit of the appended claim.

For example, the pipe which is provided with the cooling/heating switch valve V2 and connects the bottom of the vapor-liquid separator 2 and the upper portion of the evaporator 5 may be provided so as to communicate with the upper portion of the absorber 6.

When the outlet of the first space 7A is provided with an eliminator such that mist of the absorption liquid is not discharged, the refrigerant pipe connecting the second space of the exhaust heat regenerator 7 and the low-temperature regenerator 3 may be connected to the condenser 4.

It can be conceived that an eliminator is provided in the high-temperature regenerator 1 for separation of the liquid and the vapor instead of the vapor-liquid separator 2.

As described above, according to the absorption refrigerator of the present invention, the total heat efficiency can be significantly improved, thereby making it possible to greatly economize the consumption of fuel and greatly reduce $CO_2$ emissions, which significantly affects the global warming.

What is claimed is:

1. An absorption refrigerator, comprising:

high temperature and low temperature regenerators as regenerators for regenerating an absorption liquid to absorb a refrigerant by evaporating and separating a refrigerant contained in the absorption liquid by heating the absorption liquid;

an exhaust heat regenerator driven by using exhaust heat as a heat source; and high temperature and low temperature heat exchangers as heat exchangers for exchanging heat between absorption liquids of different temperatures; wherein in the exhaust heat regenerator, a first absorption liquid supplied from an absorber via the high temperature and low temperature regenerators and a second absorption liquid supplied from the absorber via the low temperature regenerator are heated by the exhaust heat for regeneration; and wherein in a cooling operation, the absorption liquid regenerated from the first absorption liquid by heating in the exhaust heat regenerator is supplied to the high temperature regenerator, a mixture fluid of liquid and vapor generated by heating in the high temperature regenerator is supplied to a vapor-liquid separator to be separated into refrigerant vapor and an absorption liquid, the refrigerant vapor separated in the vapor-liquid separator is supplied to the low temperature regenerator as a heat source together with refrigerant vapor evaporated and separated from the first absorption liquid in the exhaust heat regenerator, refrigerant vapor evaporated and separated from the second absorption liquid is supplied to either the low temperature regenerator or a condenser, the absorption liquid separated in the vapor-liquid separator is supplied to the low temperature regenerator via the high temperature heat exchanger, and an absorption liquid regenerated by heating in the low temperature regenerator joins an absorption liquid regenerated from the second absorption liquid by heating in the exhaust heat regenerator to be returned to the absorber via the low temperature heat exchanger, and wherein in a heating operation, the absorption liquid regenerated from the first absorption liquid by heating in the exhaust heat regenerator is supplied to the high temperature regenerator, a mixture fluid of liquid and vapor generated by heating in the high temperature regenerator is supplied to the vapor-liquid separator to be separated into refrigerant vapor and an absorption liquid, the refrigerant vapor and the absorption liquid separated from each other in the vapor-liquid separator are supplied to either the evaporator or the absorber together with refrigerant vapor evaporated and separated from the first and second absorption liquids in the exhaust heat regenerator, and an absorption liquid regenerated from the second absorption liquid by heating in the exhaust heat regenerator is returned to the absorber via the low temperature heat exchanger.

* * * * *